United States Patent
Stütz et al.

(10) Patent No.: US 6,550,447 B2
(45) Date of Patent: Apr. 22, 2003

(54) INTAKE PORT CONFIGURATION FOR AN INTERNAL COMBUSTION ENGINE

(75) Inventors: Harald Stütz, Semriach (AU); Franz Laimböck, Thal (AU)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/055,008

(22) Filed: Jan. 25, 2002

(65) Prior Publication Data
US 2002/0112693 A1 Aug. 22, 2002

(30) Foreign Application Priority Data

Jan. 29, 2001 (AU) ........................................ GM 71/2001
Jul. 11, 2001 (AU) ...................................... GM 554/2001

(51) Int. Cl.$^7$ ............................................... F02B 31/08
(52) U.S. Cl. ........................................ 123/308; 123/432
(58) Field of Search ................................. 123/306, 308, 123/432

(56) References Cited

U.S. PATENT DOCUMENTS

| | | | |
|---|---|---|---|
| 4,466,398 A | | 8/1984 | Nakanishi et al. |
| 4,467,750 A | * | 8/1984 | Isogai et al. ............ 123/188.14 |
| 4,519,346 A | * | 5/1985 | Nakanishi et al. ..... 123/188.14 |
| 4,909,210 A | * | 3/1990 | Shimada et al. ....... 123/188.14 |
| 5,309,880 A | | 5/1994 | Mazzella et al. |
| 5,435,283 A | * | 7/1995 | Zehr ..................... 123/188.14 |
| 5,669,347 A | * | 9/1997 | Cullen et al. ............... 123/306 |
| 5,740,778 A | * | 4/1998 | Corcoran et al. ........... 123/306 |

FOREIGN PATENT DOCUMENTS

| | | |
|---|---|---|
| AT | 003137 | 10/1999 |
| DE | 2803533 | 8/1979 |
| DE | 3302224 | 8/1983 |
| DE | 3631474 | 3/1987 |
| DE | 19901992 | 7/2000 |
| EP | 63632 | 11/1982 |
| EP | 0235288 | 9/1987 |
| EP | 0258207 | 8/1991 |
| EP | 0527122 | 2/1993 |
| EP | 0867610 | 9/1998 |
| FR | 2772832 | 6/1999 |
| JP | 07042627 | 2/1995 |

* cited by examiner

*Primary Examiner*—Erick Solis
(74) *Attorney, Agent, or Firm*—Dykema Gossett PLLC

(57) ABSTRACT

An intake port configuration (1) for an internal combustion engine wherein the swirl (D) of at least one intake flow entering the combustion chamber via an intake port controlled by an intake valve (5) can be varied, two or more flow paths are associated with at least one intake port, which paths join in the valve region (4), and the flow rate (Q) in at least one of the two flow paths is variable by means of a control element (9), and the two flow paths are constituted by two completely separate intake passages, i.e., a primary passage (2) and a secondary passage (3), the primary passage (2) having a helical form. In order to obtain a high flow rate (Q) at a high swirl level in addition to a wide range over which the swirl D may be varied, the intake valve axis (5a) intersects or is tangent to the secondary passage (3) at least at one point.

32 Claims, 4 Drawing Sheets

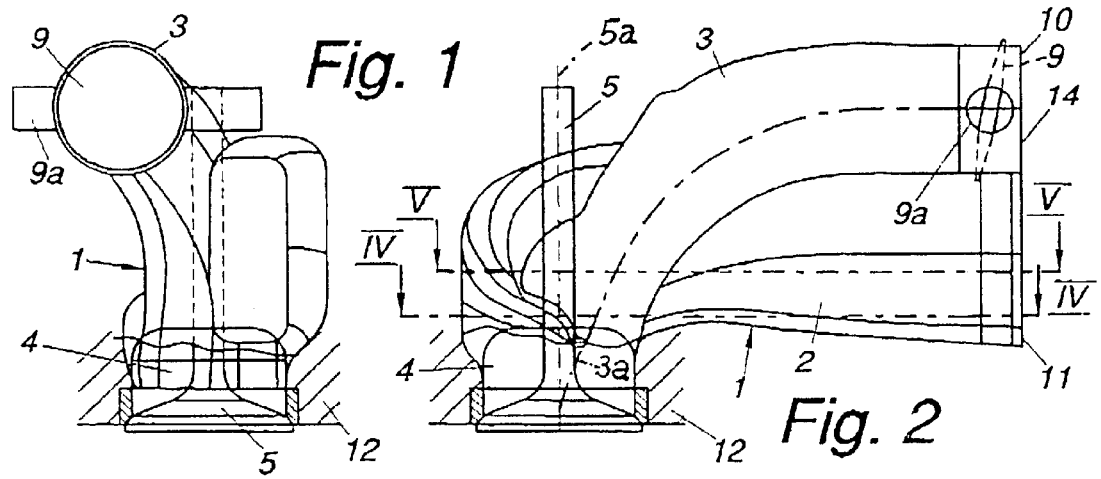
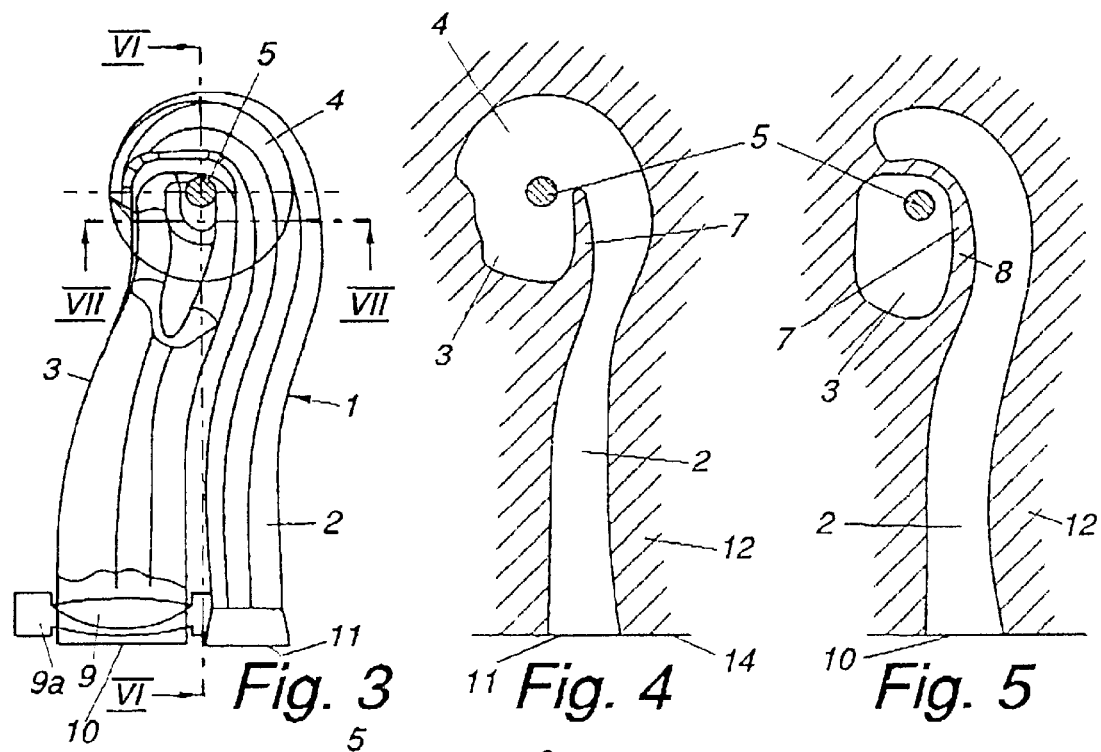
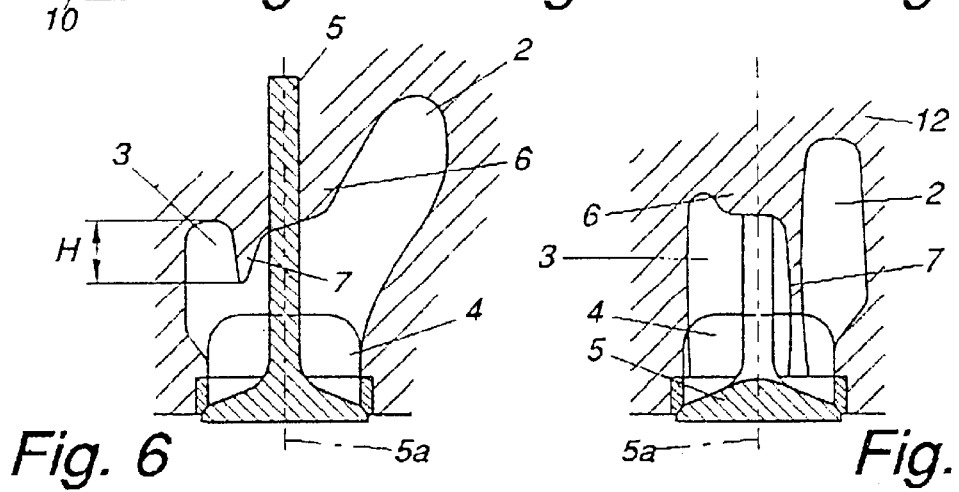

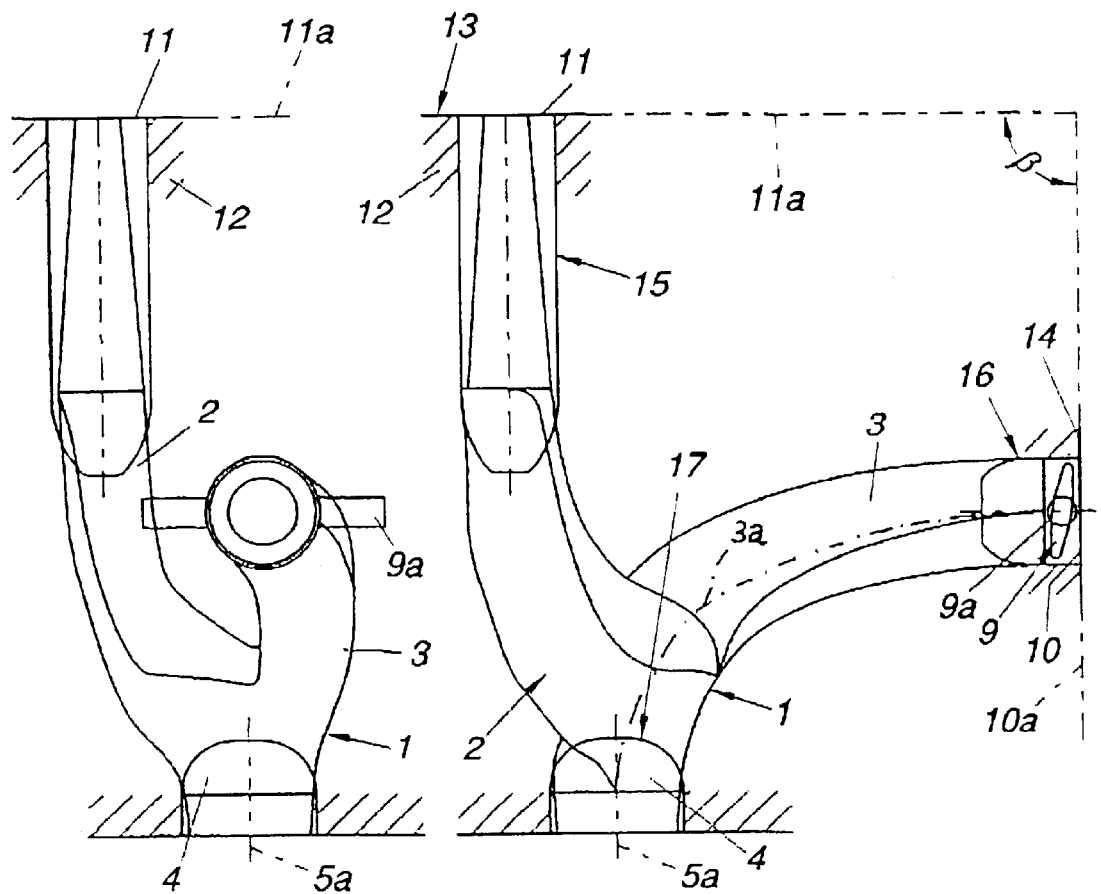
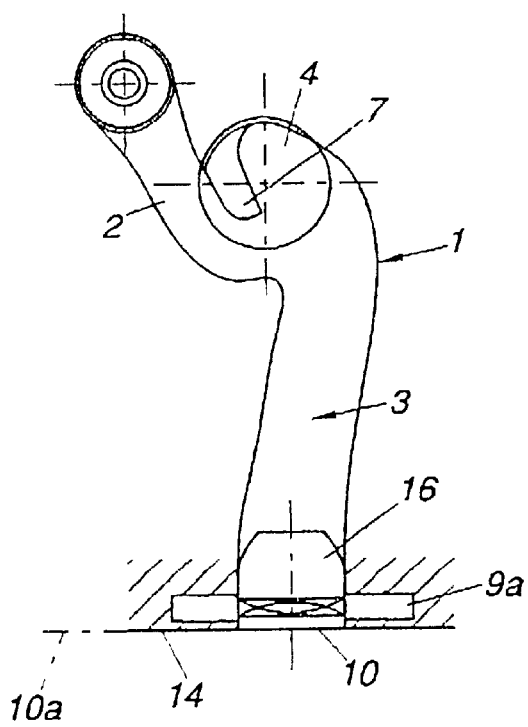

INTAKE PORT CONFIGURATION FOR AN INTERNAL COMBUSTION ENGINE

BACKGROUND OF THE INVENTION

The invention relates to an intake port configuration for an internal combustion engine, where the swirl of at least one intake flow entering the combustion chamber via an intake port controlled by an intake valve can be varied, two or more flow paths being associated with at least one intake port, which paths join in the valve region, and the flow rate in at least one of the two flow paths being variable by means of a control element, and the two flow paths being formed by two completely separate intake passages, i.e., a primary passage and a secondary passage, which primary passage has a helical form.

DESCRIPTION OF PRIOR ART

In EP 0 258 207 B1 an intake port for internal combustion engines is described, which is provided with a dividing wall extending in longitudinal direction. In order to achieve a strong swirl flow in the cylinder under part-load conditions and obtain optimum filling of the cylinder at high engine speeds, the dividing wall is located in an intake port parallel to the cylinder axis, which on its own produces a very low swirl level. If a swirl flow is desired one portion of the port is closed by a control flap. As a consequence the flow of charge through the valve into the cylinder will be unsymmetrical, and a strong rotational flow will result by the interaction between charge and cylinder wall. The disadvantage of this design is that due to the basically neutral shape of the port the possible range will cover only low to medium swirl levels.

In AT 003 137 U1 an internal combustion engine with two intake valves per cylinder is disclosed, each of which is provided with an intake port. One of the two intake ports is divided into two passages by means of a partitioning wall extending over the entire port height. Once again the swirl level can be adjusted within a relatively narrow range only.

From EP 0 235 288 A1 an intake port configuration of the type mentioned in the initial paragraph is known. The secondary passage is configured as a swirl flow passage entering the helix of the primary passage against the flow direction of the latter which is configured as a helical passage. The disadvantage of this design is that the flow rate is significantly reduced when the swirl flow is deactivated compared to a fixed swirl pattern.

The demand for a variable swirl control in an internal combustion engine is thus characterized by an innate conflict of purpose, between a maximum control range within which the swirl flow should be adjustable and a maximum flow rate at a high swirl level.

SUMMARY OF THE INVENTION

It is the object of the present invention to avoid the above disadvantages and to develop an intake port configuration which will permit a high flow rate at a high swirl level, and a wide range of adjustment for the swirl flow.

In accordance with the invention this object is achieved by providing that the axis of the intake valve intersects or is tangent to the secondary passage at least at one point. The secondary passage may be designed as neutral passage or tangential passage, or it may assume various intermediate forms between the two extremes. In a preferred variant the secondary passage opens into the valve region in the direction of the intake valve axis, the axis of the secondary passage preferably coinciding with the axis of the intake valve in the valve region. The two intake passages thus lead to a single intake valve, the primary passage winding helically around the valve guide lug, whereas the secondary passage leads directly into the region of the valve guide lug of the primary passage, essentially concentrically with the intake valve axis.

The cross-sections of primary and secondary passages may be substantially equal according to a variant of the invention. This design has the advantage that the swirl motion will be adjustable over a very wide range, whilst a satisfactory flow rate will be obtained for both high and low swirl levels.

For adjusting the swirl level the control element should preferably be positioned in the secondary passage. In addition, it may be also provided that the flow rate in the primary passage be adjusted by a control element.

The control element may be configured as a flap, slide valve, cylindrical valve or the like, and the secondary passage and/or primary passage may be at least partially closed by the control element according to a preferred version.

In an especially preferred variant of the invention the proposal is put forward that primary passage and secondary passage have separate flange faces, the flange face of the secondary passage preferably being displaced relative to the flange face of the primary passage. The advantage of this arrangement is that in the instance of a flap-type control element the flap axis will not extend through the cross-section of the primary passage.

Primary and secondary passages start from the same side or different sides of the cylinder head. In an alternative configuration for a different set of boundary conditions at the cylinder head the primary passage at least will start from the top of the cylinder head. The primary passage runs essentially in the direction of the axis of the intake valve.

In a particularly preferable variant of a system with high swirl level it is provided that the flange face of the primary passage and the flange face of the secondary passage are located in different planes preferably subtending an angle of about 90°.

In further development of the invention it is proposed that a flow guide rib be provided in the region of the valve guide lug as an extension of a partitioning wall between primary passage and secondary passage, which flow guide rib is open towards the intake port, the height of said rib preferably decreasing in flow direction, and the flow guide rib at least partially following the helical form of the primary passage in an especially preferred version. The flow guide rib formed at the intersection of the two individual passages will have its impact on the flow characteristic of the intake flow arriving at the combustion chamber. Compared to previously known intake port configurations with passages formed by a partitioning wall, the design of the flow guide rib will permit more variation.

The intake port configuration may be employed with internal combustion engines with one, two, or more intake valves per cylinder. In intake systems with a plurality of valves the partitioning of the intake port will considerably improve the flow rate at a high swirl level, compared with conventional shut-off systems.

In further development of the invention it is proposed that a fuel injection device for individual fuel injection enter at least one intake passage, i.e., preferably the secondary passage. To prevent fuel from being deposited at the wall of the helical end of the passage, which would considerably increase emissions and fuel consumption, it is proposed in a preferred variant of the invention that the fuel jet delivered from the fuel injection device be directed onto the valve head of the intake valve. The fuel is thus injected into the secondary passage and is transported swirl-free by the secondary air stream into the valve region of the helical passage, the flow being directed against the valve head. Since the fuel stream is enveloped by secondary air no fuel droplets will settle on the wall of the helical end of the passage.

In order to promote fuel concentration at the central passage area it is proposed that the axis of the fuel jet subtend an angle of 0° to 45° with the intake valve axis, the axis of the fuel jet preferably intersecting the axis of the intake valve in the area of the valve head.

In yet another advantageous variant of the invention the proposal is put forward that the secondary passage, which is entered by the fuel injection device, should end in the area of the valve head in the immediate vicinity of the valve stem. The fuel is thus injected directly into the valve region in the direction of the valve head. The secondary passage, which may advantageously be formed by a pipe inserted into the valve region, will protect the fuel stream against the intake flow of the helical passage and will prevent fuel particles from being swept along with the swirl flow and carried towards the wall of the helical end of the passage.

BRIEF DESCRIPTION OF THE DRAWINGS

The invention will now be explained in more detail be reference to the accompanying drawings, wherein FIG. 1 shows an intake port configuration according to a first variant of the invention, as a side elevation in the direction of the intake flow, FIG. 2 shows the above intake port configuration in a view transversely to the flange planes, FIG. 3 shows a view of this intake port configuration from above, FIG. 4 shows the intake port configuration in a section along line IV—IV in FIG. 2, FIG. 5 shows the intake port configuration in a section along line V—V in FIG. 2, FIG. 6 shows the intake port configuration in a section along line VI—VI in FIG. 3, FIG. 7 shows the intake port configuration in a section along line VII—VII in FIG. 3, FIG. 8 shows an intake port configuration according to a second variant of the invention, in the direction of the intake flow of the secondary passage, FIG. 9 shows the above intake port configuration in a view transversely to the flange planes, FIG. 10 shows a view of this intake port configuration from above.

Parts of the same function bear the same reference numerals in all variants.

DESCRIPTION OF THE PREFERRED EMBODIMENTS

Figure 11:
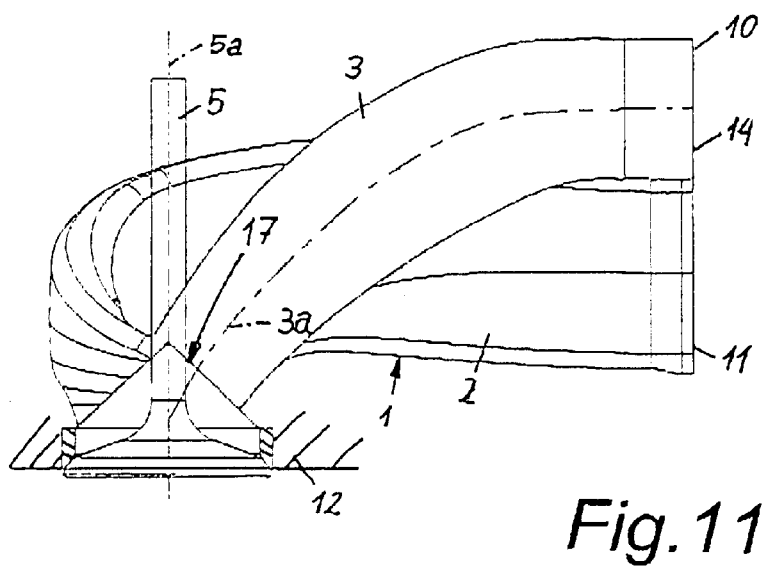
FIG. 11 shows an intake port configuration according to a third variant of the invention.
Figure 12:
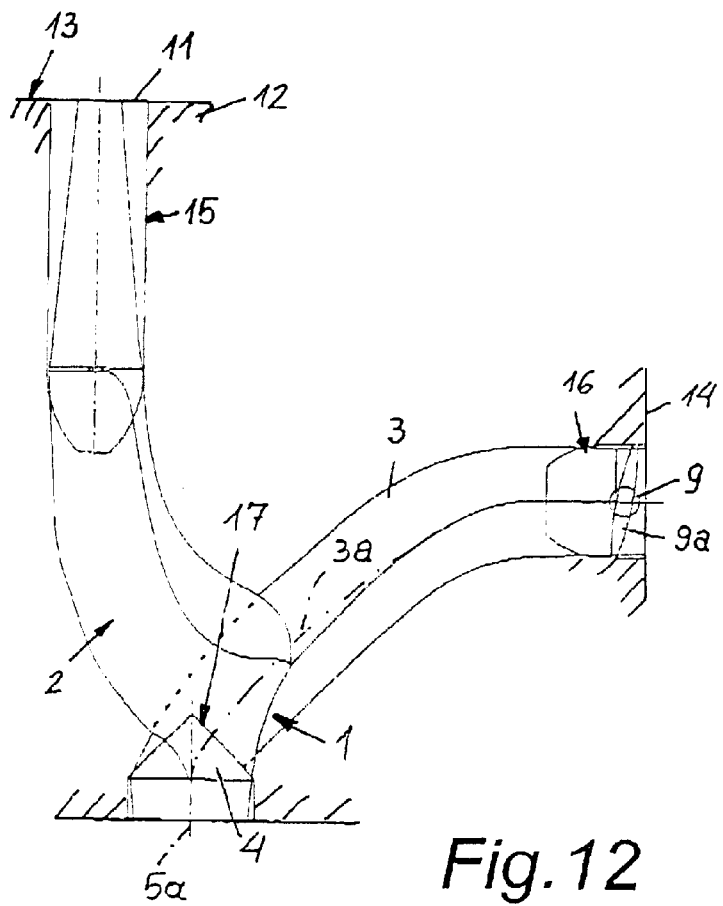
FIG. 12 shows an intake port configuration according to a fourth variant of the invention.

The intake port configuration 1 for an internal combustion engine comprises a primary passage 2 and a secondary passage 3 uniting in the valve region 4 of the intake valve 5. Primary passage 2 and secondary passage 3 are configured as completely separate paths until they enter the valve region 4. The primary passage 2 is helical whilst the secondary passage 3 is configured as a neutral passage or tangential passage. In the variants presented in FIGS. 1 to 10 the secondary passage 3 is a neutral passage, and in the variants of FIGS. 11 and 12 a tangential passage. It would also be possible for the secondary passage 3 to vary between a neutral and a tangential passage or assume some intermediate form. The two intake passages 2, 3 starting from an intake manifold not further shown in the drawings, lead to a single intake valve 5, the primary passage 2 winding helically around the valve guide lug 6 and the secondary passage 3 leading directly into the region of the valve guide lug 6. The secondary passage 3 opens into the valve region 4 in the direction of the intake valve axis $5a$, preferably concentrically therewith, the axis $3a$ of the secondary passage 3 essentially coinciding with the intake valve axis $5a$ in the passage entrance area. The cross-sections of primary and secondary passages 2, 3 are essentially equal.

At the intersection of primary passage 2 and secondary passage 3 a flow guide rib 7 is formed, which has a certain impact on the flow characteristic of the intake flow. The flow guide rib 7 is designed as an extension of the partitioning wall 8 between primary passage 2 and secondary passage 3, the height H of the flow guide rib 7 decreasing in flow direction. The flow guide rib 7 follows the helical form of primary passage 2.

The secondary passage 3 is shut entirely or partially by means of a control element 9, which may be designed as a flap, slide valve, or cylindrical valve, or the like (see FIG. 2). The flange face 10 of the secondary passage 3 is preferably kept at a slightly displaced position relative to the flange face 11 of the primary passage 2, so that the axis $9a$ of a control element 9 configured as a flap will not lead through the cross-section of the primary passage 2. A control element could also be positioned in the primary passage 2, if desired, thus providing additional swirl control.

The variants shown in FIGS. 8 to 10 and 12 differ from those in FIGS. 1 to 7 and 11 in that the primary passage 2 and secondary passage 3 depart from different sides of the cylinder head 12. The primary passage 2, which runs in the direction of axis $5a$ essentially, starts at the top 13, while the secondary passage 3 starts at the side 14 of the cylinder head 12. Flange faces 10, 11 of the primary passage 2 and secondary passage 3 are located in different planes $10a$, $11a$, which subtend an angle β of 0° to 90°. The secondary passage 3 might also depart from the top 13 of the cylinder head 12, however.

Reference numerals 15, 16, and 17 identify control sections for primary passage 2 and secondary passage 3 and in the valve region 4.

Figure 13:
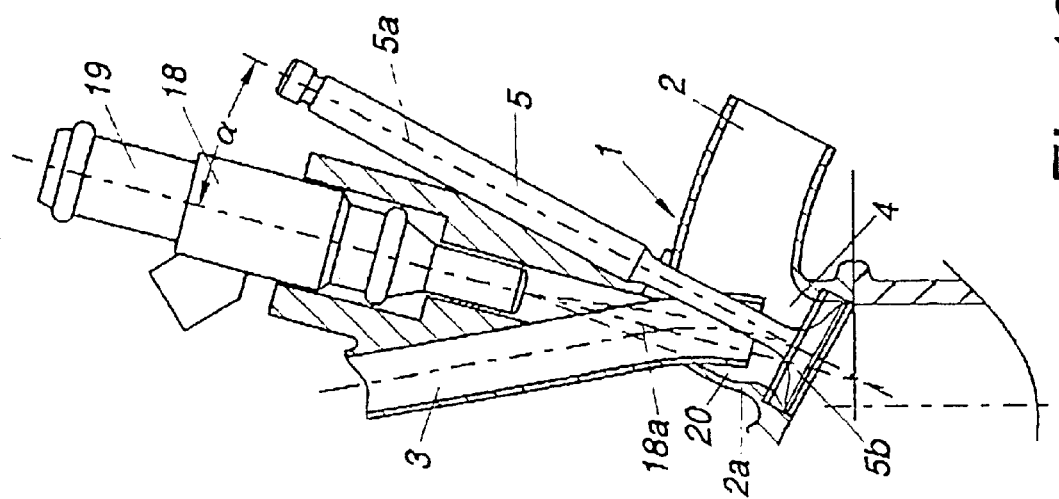
FIG. 13 shows an intake port configuration according to a fifth variant of the invention.

FIG. 13 shows a variant of an intake port configuration 1 with a primary passage 2 configured as a swirl passage, which opens into a combustion chamber (not shown here in full detail) via an intake valve 5. The valve region 4 contains a secondary passage 3 formed by a pipe, into which opens a fuel injection device 18. The fuel jet axis 19 is oriented towards the valve head $5b$ and subtends an angle α of 0° to 45° with the intake valve axis $5a$. The secondary passage 3 ends directly in front of the intake valve 5. This will facilitate well-aimed fuel injection into the center of the valve region 4, and will thus avoid the depositing of fuel particles at the walls $2a$ of the helical end 20.

Axis 19 of the fuel jet $18a$ intersects the intake valve axis $5a$ approximately in the region of the valve head $5b$. By directing the fuel jet 18a against the valve head 5b and enveloping it by secondary air, the fuel droplets will not be transported towards the wall 2a of the helical end 20.

The intake port configuration 1 may be used with engines having a single intake valve 5 per cylinder, and also with engines having two or more intake valves. In engines with two or more intake valves per cylinder it will be possible to join the primary passage 2 with other primary passages of the intake system inside the cylinder head.

In comparison with conventional intake port configurations with a single intake port which is divided into two parts by means of a wall, the present system has the advantage of a wide range over which the swirl may be varied.

Figure 14:
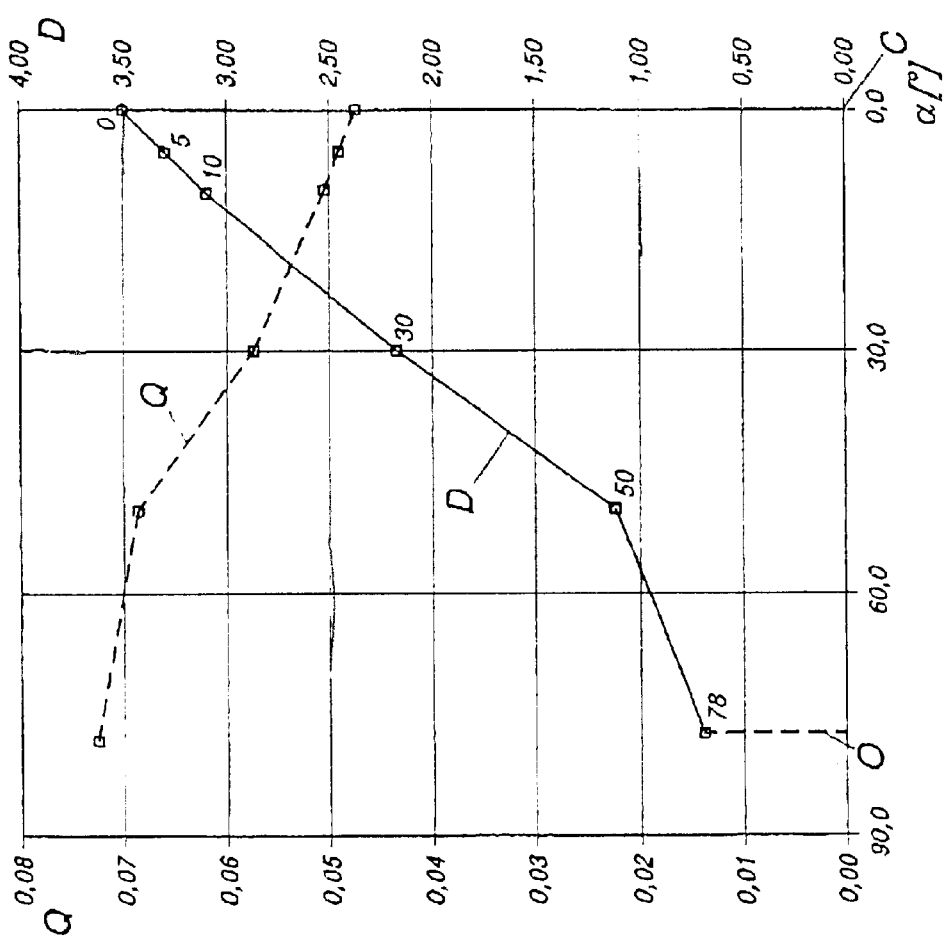
FIG. 14 shows a characteristic curve diagram of the intake port configuration.

In the diagram of FIG. 14 swirl D and flow rate Q are shown as functions of flap angle α for an exemplary intake port configuration with a control element configured as a flap. The flap angle α=0 refers to the closed position of the flap. At about 78° the flap is wide open. It can be seen clearly that the swirl D may be varied over a wide range between the open position 0 and the closed position C without reducing the flow rate Q to an appreciable extent.

What is claimed is:

1. An intake port configuration for an internal combustion engine, where a swirl of at least one intake flow entering a combustion chamber via an intake port controlled by an intake valve can be varied, two or more flow paths being associated with at least one intake port, which paths join in a valve region, and a flow rate in at least one of the two flow paths being variable by means of a control element, and the two flow paths being constituted by two completely separate intake passages, i.e., a primary passage and a secondary passage, said primary passage having a helical form, wherein an intake valve axis intersects or is tangent to the secondary passage at least at one point.

2. Intake port configuration according to claim 1, wherein the secondary passage opens into the valve region in the direction of the intake valve axis.

3. Intake port configuration according to claim 2, wherein an axis of the secondary passage is coinciding with the intake valve axis in the valve region.

4. Intake port configuration according to claim 2, wherein the secondary passage opens into the valve region essentially concentrically with the intake valve axis.

5. Intake port configuration according to claim 1, wherein the secondary passage is designed as a neutral passage or tangential passage.

6. Intake port configuration according to claim 1, wherein the flow cross-sections of primary passage and secondary passage are substantially equal.

7. Intake port configuration according to claim 1, wherein the control element is positioned in the secondary passage.

8. Intake port configuration according to claim 1, wherein the flow rate in the primary passage can be adjusted by said control element.

9. Intake port configuration according to claim 1, wherein the control element is configured as a flap.

10. Intake port configuration according to claim 1, wherein the control element is configured as a slide valve.

11. Intake port configuration according to claim 1, wherein the control element is configured as a cylindrical valve.

12. Intake port configuration according to claim 1, wherein the secondary passage can be at least partially closed by the control element.

13. Intake port configuration according to claim 1, wherein the primary passage can be at least partially closed by the control element.

14. Intake port configuration according to claim 1, wherein primary passage and secondary passage have separate flange faces.

15. Intake port configuration according to claim 14, wherein the flange face of the secondary passage is displaced relative to the flange face of the primary passage.

16. Intake port configuration according to claim 1, wherein primary passage and secondary passage start from different sides of a cylinder head.

17. Intake port configuration according to claim 1, wherein primary passage and secondary passage start from the same sides of the cylinder head.

18. Intake port configuration according to claim 1, wherein at least the primary passage will start from the top of the cylinder head.

19. Intake port configuration according to claim 1, wherein at least the secondary passage will start from a side of the cylinder head.

20. Intake port configuration according to claim 1, wherein a flange face of the primary passage and a flange face of the secondary passage are located in different planes.

21. Intake port configuration according to claim 1, wherein a flow guide rib is provided in a region of a valve guide lug as an extension of a partitioning wall between primary passage and secondary passage, said flow guide rib being open towards the intake port.

22. Intake port configuration according to claim 21, wherein a height of said flow guide rib is decreasing in flow direction.

23. Intake port configuration according to claim 21, wherein said flow guide rib is at least partially following the helical form of the primary passage.

24. Intake port configuration according to claim 1, wherein a fuel injection device for individual fuel injection enters at least one intake passage.

25. Intake port configuration according to claim 24, wherein the fuel injection device enters the secondary passage.

26. Intake port configuration according to claim 24, wherein a fuel jet delivered from the fuel injection device is directed onto a valve head of the intake valve.

27. Intake port configuration according to claim 26, wherein an axis of the fuel jet subtends an angle of 0° to 45° with the intake valve axis.

28. Intake port configuration according to claim 26, wherein an axis of the fuel jet intersects the intake valve axis in the area of the valve head.

29. Intake port configuration according to claim 24, wherein the secondary passage, which is entered by the fuel injection device, ends in an area of the valve head in an immediate vicinity of a valve stem.

30. Intake port configuration according to claim 29, wherein the secondary passage is formed by a pipe inserted into the valve region.

31. Intake port configuration according to claim 1, wherein a flange face of the primary passage and a flange face of the secondary passage are located in different planes.

32. Intake port configuration according to claim 31, wherein the planes are subtending an angle of about 90°.

* * * * *

UNITED STATES PATENT AND TRADEMARK OFFICE
CERTIFICATE OF CORRECTION

PATENT NO.     : 6,550,447 B2
DATED          : April 22, 2003
INVENTOR(S)    : Harald Stütz and Franz Laimböck It is certified that error appears in the above-identified patent and that said Letters Patent is hereby corrected as shown below:

<u>Title page,</u>
Item [75], Inventors, please delete the present text and insert the following:
-- [75]  Inventors: Harald Stütz, Semriach (AT); Franz Laimböck, Thal (AT) --

Signed and Sealed this

Second Day of September, 2003

JAMES E. ROGAN
*Director of the United States Patent and Trademark Office*